US009485998B2

(12) United States Patent
Liimatta

(10) Patent No.: US 9,485,998 B2
(45) Date of Patent: Nov. 8, 2016

(54) MICROBIOLOGICAL AND ENVIRONMENTAL CONTROL IN POULTRY PROCESSING

(71) Applicant: Albemarle Corporation, Baton Rouge, LA (US)

(72) Inventor: Eric W. Liimatta, Baton Rouge, LA (US)

(73) Assignee: ALBEMARLE CORPORATION, Baton Rouge, LA (US)

( * ) Notice: Subject to any disclaimer, the term of this patent is extended or adjusted under 35 U.S.C. 154(b) by 0 days.

(21) Appl. No.: 14/994,533

(22) Filed: Jan. 13, 2016

(65) Prior Publication Data

US 2016/0120196 A1    May 5, 2016

Related U.S. Application Data

(62) Division of application No. 12/445,673, filed as application No. PCT/US2007/082063 on Oct. 22, 2007, now Pat. No. 9,277,755.

(60) Provisional application No. 60/862,478, filed on Oct. 23, 2006.

(51) Int. Cl.
*A22B 7/00* (2006.01)
*A22C 21/00* (2006.01)
(Continued)

(52) U.S. Cl.
CPC ........... *A22C 21/04* (2013.01); *A22C 21/0061* (2013.01); *A22C 21/02* (2013.01); *A23B 4/20* (2013.01); *A23L 3/3544* (2013.01)

(58) Field of Classification Search
CPC .... A22C 21/0061; A23B 4/20; A23L 3/3544
USPC .................. 426/332; 452/173, 123
See application file for complete search history.

(56) References Cited

U.S. PATENT DOCUMENTS 5,173,190 A * 12/1992 Picek ............... B01D 17/02
210/259
5,683,724 A 11/1997 Hei et al.
(Continued)

FOREIGN PATENT DOCUMENTS

EP    0827695 A2    11/1998
WO   0153215 A1    7/2001
(Continued)

OTHER PUBLICATIONS

Author Unknown; "H-5100: Scalding Tank"; website http://www.industriesriopel.com/H5100.html, visited Sep. 12, 2006; 2 pages.
(Continued)

*Primary Examiner* — Richard Price, Jr.
(74) *Attorney, Agent, or Firm* — Marcy M. Hoefling

(57) ABSTRACT

Poultry carcasses are contacted with water treated with one or more specified dihalodialkylhydantoin biocides in a processing operation downstream from a scalding tank. The aqueous effluent from that downstream operation or from any location further downstream is recycled to the scalding tank. Surprisingly, the bromine residues from the dihalodialkylhydantoin biocides are much more thermally unstable than, for example, the commonly used microbiocide, sodium hypochlorite. Thus, the effluent from the scalding tank has its active bromine content significantly reduced before it is sent to a water purification facility wherein microbial action is used to reduce the BOD of the waste water before its release to the environment. Thus, injury to this desired microbial action is reduced. In addition, the recycle reduces water consumption in the overall poultry processing operation.

8 Claims, 2 Drawing Sheets

(51) Int. Cl.
*A22C 21/04* (2006.01)
*A23B 4/20* (2006.01)
*A23L 3/3544* (2006.01)
*A22C 21/02* (2006.01)

(56) References Cited

U.S. PATENT DOCUMENTS

| | | | |
|---|---|---|---|
| 6,113,963 | A | 9/2000 | Gutzmann et al. |
| 6,508,954 | B1 | 1/2003 | Elnagar et al. |
| 6,565,868 | B1 | 5/2003 | Howarth et al. |
| 6,802,984 | B1 | 10/2004 | Perkins et al. |
| 6,908,636 | B2 | 6/2005 | Howarth |
| 6,919,364 | B2 | 7/2005 | Howarth et al. |
| 6,986,910 | B2 | 1/2006 | Howarth |
| 6,998,369 | B2 | 2/2006 | Hei et al. |
| 7,008,545 | B2 | 3/2006 | Cronan, Jr. et al. |
| 2003/0094422 | A1 | 5/2003 | Perkins et al. |
| 2004/0265445 | A1* | 12/2004 | Liimatta ............ A22C 21/0061 426/332 |
| 2005/0153032 | A1 | 7/2005 | Hilgren et al. |
| 2005/0159324 | A1 | 7/2005 | Man et al. |
| 2005/0271779 | A1 | 12/2005 | Howarth |
| 2006/0004072 | A1 | 1/2006 | Howarth et al. |

FOREIGN PATENT DOCUMENTS

| | | | |
|---|---|---|---|
| WO | 02054866 | A1 | 7/2002 |
| WO | 2005004612 | A1 | 1/2005 |
| WO | 2005004614 | A1 | 1/2005 |
| WO | 2005067741 | A1 | 7/2005 |

OTHER PUBLICATIONS

Author Unknown; "Slaughtering LINCO Large Bird Scalding Tank"; website http://www.lincofood.com/equipment/detail.asp?prod_id=176, visited Sep. 12, 2006; 1 page.

Author Unknown; "Water Quality Monitoring: Biochemical Oxygen Demand"; website http://www.fivecreeks.org/monitor/bod.html, visited Sep. 13, 2006; 1 page.

FAO Animal Production Health Paper—91, "Guidelines for Slaughtering Meat Cutting and Further Processing", Food and Agriculture Organization of the United Nations, 1991 (24 pages).

Hach Water Analysis Handbook, 3rd Edition, 1997; pp. 1206-1207; (4 pages).

Smith, G., "Poultry Industry Looks to Chlorine Dioxide for Pathogen Control", Meat Processing, 1996, 35(10), 47 (Abstract Only).

Grady, Jr., C.P. Leslie et al., "Biological Wastewater Treatment"; Marcel Dekker, Inc.; New York and Basel; 1980; Chapter 7; pp. 197-228.

Capita, Rosa et al., "Effect of Trisodium Phosphate Solutions Washing on the Sensory Evaluation of Poultry Meat"; Meat Science; 2000; 55; pp. 471-474.

Palin, A.T.; Methods for the Determination, in Water, of Free and Combined Available Chlorine, Chlorine Dioxide and Chlorite, Bromine, Iodine, and Ozone, Using Diethyl-p-Phenylene Diamine (DPD); Journal of the Institute of Water Engineers; 1967; 21; 537-547.

Palin, A. T.; "Analytical Control of Water Disinfection With Special Reference to Differential DPD Methods for Chlorine, Chlorine Dioxide, Bromine, Iodine and Ozone", J. Inst. Water Eng., 1974, 28, 139.

M. Fernandez-Crehuet Navajas et al.; "Determination of Residual Chlorine. Method DPD"; Hygiene and Environmental Health; 1: 6-7; 2001.

H.H. Willard et al.; "Elementary Quantitative Analysis", Third Edition, D. Van Nostrand Company, Inc., New York, copyright 1933, 1935, 1940; Chapter XIV; pp. 261-271.

* cited by examiner

MICROBIOLOGICAL AND ENVIRONMENTAL CONTROL IN POULTRY PROCESSING

CROSS-REFERENCE TO RELATED APPLICATIONS

This application is a divisional of U.S. application Ser. No. 12/445,673, filed Apr. 15, 2009, now U.S. Pat. No. 9,277,755, which is the National Stage of International Patent Application No. PCT/US2007/082063, filed on Oct. 22, 2007, which claims the benefit and priority of U.S. Provisional Application No. 60/862,478, filed Oct. 23, 2006. Each patent application identified above is incorporated here by reference in its entirety to provide continuity of disclosure.

BACKGROUND

Poultry processing is an area in which microbiological control is of vital importance. By the very nature of the processing involved there are numerous opportunities for the poultry to be exposed to various pathogens in the form of mobile bacteria such as for example *Escherichia coli*, *Salmonella enteritidis*, *Salmonella typhimurim*, *Campylobacter jejuni*, *Campylobacter coli*, *Campylobacter lari*, and in the form of biofilms such as for example *Listeria monocytogenes*, *Pseudomonas fluorescens*, *Pseudomonas aeruginosa*, *Enterococcus faecium*, and *Staphylococcus aureus*. Handling, processing and consuming bacteria-infested poultry is to be minimized, if not avoided.

In recent years, new effective microbiocides for use in the processing of poultry for food have been discovered and described. See for example U.S. Pat. Nos. 6,908,636; 6,919,364; 6,986,910 and U.S. Patent Application Pub. No. 2006/0004072 A1.

In the processing of poultry for food, large quantities of water are necessarily used. Recycle of water in the processing is a way of reducing the amount of water used and the amount of wastewater produced. However, use of effective microbiocides in the processing operations gives rise to problems associated with treating wastewater in order to reduce its biochemical oxygen demand (BOD) prior to release to the environment. These problems result from the fact that in order to reduce the BOD, microorganisms are utilized in the wastewater to destroy various impurities including organic matter. Thus, the wastewater itself which contains biocidally-active residues from halogen-based microbiocides, especially bromine-based microbiocides, tends to inhibit the activity of such microorganisms because of the toxicity of these residues toward these microorganisms. Such microorganisms include for example, floc-forming organisms, saprophytes, predators, and nuisance organisms. See in this connection Grady and Lim, *Biological Wastewater Treatment*, Marcel Dekker Inc., Copyright, 1980, Chapter 7.

Therefore, it would be highly desirable if a practical, economically-feasible way could be found for reducing water consumption and discharge from operations in which poultry is processed for food while at the same time, reducing the toxicity of the biocidally-active residues resulting from use of a halogen-based microbiocide in such processing.

NON-LIMITING SUMMARY OF THE INVENTION

This invention is deemed to provide a practical, economically-feasible way for reducing water consumption and discharge from operations in which poultry is processed for food while at the same time, reducing the toxicity of the biocidally-active residues resulting from use of a halogen-based microbiocide in such processing.

In accordance with one embodiment of this invention there is provided a process of processing poultry for food in a plurality of processing operations, wherein the process comprises:

A) contacting poultry carcasses in one or more downstream processing operations with an aqueous medium containing an effective microbial inhibiting amount of active bromine resulting from the addition to said medium of a microbiocide comprising (i) at least one 1,3-dihalo-5,5-dialkylhydantoin in which both of the halo atoms are bromine atoms and one of the alkyl groups is a methyl group and the other is a $C_{1-4}$ alkyl group or (ii) at least one 1,3-dihalo-5,5-dialkylhydantoin in which one of the halo atoms is a bromine atom and the other is a chlorine atom, and both alkyl groups are, independently, $C_{1-4}$ alkyl groups, or (iii) both of (i) and (ii), said one or more downstream processing operations being located downstream from a scalding operation;

B) recycling to the scalding operation, effluent aqueous medium from at least one downstream location which contains a microbial inhibiting amount of active bromine resulting from the addition of (i), (ii), or (iii); and C) having aqueous medium proceed, or causing aqueous medium to proceed, from the scalding operation to a waste water purification operation wherein microbial action is utilized to reduce the biochemical oxygen demand of waste water from the process.

In preferred embodiments, the recycling in B) involves recycling to the scalding operation, effluent aqueous medium from at least one of the one or more downstream processing operations to which (i), (ii), or (iii) was added in A). These downstream locations are preferred because operations in a chill tank or in a post-chill dip or spray operation, while feasible, involve use of cold water and thus recycle of such cold water to the scalding operation requires the input of additional heat energy to maintain the temperature of the scalding operation in a suitable range, such as in the range of about 50 to about 60 EC.

More preferably, effluent aqueous medium that is recycled in B) in the above process is effluent aqueous medium or effluent aqueous media from whichever of the one or more downstream processing operations, (i), (ii), or (iii), was added in A).

Another preferred embodiment is a process as above wherein aqueous medium to which (i), (ii), or (iii) is added in A) and which as effluent is recycled to the scalding operation in B) is effluent aqueous medium from at least one operation selected from the group consisting of (a) an inside-outside bird washing operation, (b) a continuous online processing operation, (c) an offline reprocessing operation, and (d) a prechill spray operation. In this embodiment it is especially preferred that the aforesaid effluent aqueous medium is effluent aqueous medium from whichever of (a), (b), (c), and (d) that had (i), (ii), or (iii) added thereto in A).

In preferred embodiments of this invention, the microbiocide used is one or more water-soluble 1,3-dibromo-5,5-dialkylhydantoins in which one of the alkyl groups is a methyl group and the other is an alkyl group containing from 1 to about 4 carbon atoms, with 1,3-dibromo-5,5-dimethylhydantoin being the most preferred of all.

Additional embodiments of this invention comprise apparatus for processing poultry for food in a plurality of processing operations, wherein the apparatus comprises at least (a) a scalding vessel or station in which feathered poultry carcasses are contacted with a hot aqueous medium, (b) picker apparatus or de-feathering station in which feathers are removed from said carcasses, (c) eviscerating apparatus or an eviscerating station in which de-feathered carcasses are eviscerated, (d) inside-outside bird washing apparatus or station wherein the insides and the outsides of eviscerated poultry carcasses are cleansed with one or more streams of an aqueous medium, (e) a continuous online processing operation or station wherein both the inside and the outside of the carcass are sprayed, or an offline reprocessing operation wherein both the inside and the outside of the carcass are sprayed, (f) optionally, at least one pre-chill spray cabinet or station wherein poultry carcasses are sprayed with aqueous medium, (g) at least one chill tank or vessel in which poultry carcasses are immersed in cold aqueous medium, and (h) optionally, a post-chill dip or spray apparatus or station in which poultry carcasses from the chill tank are rinsed with cold aqueous medium, wherein:

A) at least one aqueous liquid medium input apparatus or device adapted to provide to at least one apparatus or station downstream from said scalding vessel or station, an aqueous medium containing an effective microbial inhibiting amount of active bromine resulting from the addition to said medium of (i) at least one 1,3-dihalo-5,5-dialkylhydantoin in which both of the halo atoms are bromine atoms and one of the alkyl groups is a methyl group and the other is a $C_{1-4}$ alkyl group or (ii) at least one 1,3-dihalo-5,5-dialkylhydantoin in which one of the halo atoms is a bromine atom and the other is a chlorine atom, and both alkyl groups are, independently, $C_{1-4}$ alkyl groups, or (iii) both of (i) and (ii);

B) at least one aqueous liquid medium-carrying system or apparatus adapted to carry and transmit to said scalding vessel or station, aqueous liquid medium effluent from at least one apparatus or station in which said effluent contains bromine residue remaining from input from the liquid medium input apparatus or device of A), said at least one apparatus or station being downstream from said scalding vessel or station; and C) at least one aqueous liquid medium carrying system or apparatus adapted to carry and transmit effluent from said scalding vessel or station to a waste water treatment or purification facility adapted to utilize microbial action to reduce the biochemical oxygen demand of waste water resulting from the processing of the poultry for food.

In preferred embodiments of the above apparatus, the at least one aqueous liquid medium-carrying system or apparatus in B) is disposed or connected so as to be adapted to carry and transmit to the scalding vessel or station, aqueous liquid medium effluent from at least one apparatus or station to which (i), (ii), or (iii) is adapted to be provided in A).

The above and other embodiments and features of this invention will be still further apparent from the ensuing description, accompanying drawings, and appended claims.

FURTHER DETAILED DESCRIPTION OF EMBODIMENTS OF THE INVENTION

Figure 1:
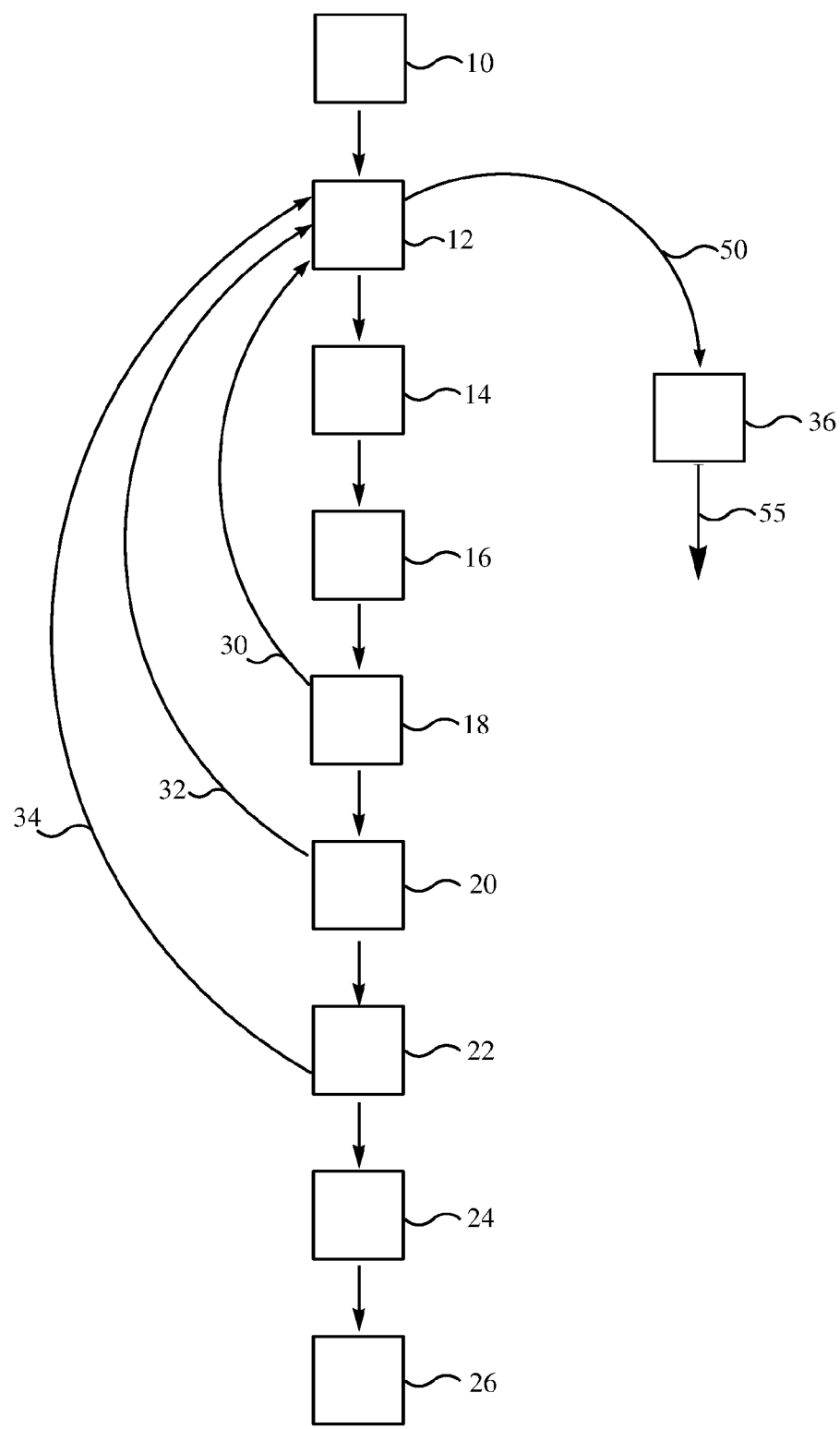
FIG. 1 is a block diagram showing the poultry processing operations of a typical processing line in a facility processing poultry for food and illustrating various preferred recycling operations made possible by this invention to achieve the advantageous results made possible by this invention.

In typical poultry processing operations the sequence of operations comprises killing the birds (usually after stunning them), scalding the feathered poultry carcasses in a scalder or scalding tank, defeathering the carcasses (usually in a picker device), eviscerating the carcasses, subjecting eviscerated carcasses to inside-outside washing, subjecting eviscerated carcasses to continuous online processing or to certain offline reprocessing of carcasses, optionally subjecting the carcasses to prechill spray (typically in a spray cabinet), chilling the carcasses in a chill tank filled with a cold aqueous medium, and optionally subjecting the carcasses to a post-chill dip or spray. Other operations such as cold storage, etc., are also frequently used. In many of these operations, water is used either for washing or for serving as a contact medium for chilling and/or for applying an aqueous microbiocidal solution to the bird and/or carcass. Ordinarily, the effluent water used in a given operation is allowed or caused to be transmitted to a waste water treating facility such a filtering operation to remove solids and a pond or large pool in which the liquid effluent is subjected to microbial action in order to reduce the BOD of the water prior to its release into the environment.

As noted above, a microbiocide is used pursuant to this invention. One suitable type is one or more N,N=-bromochloro-5,5-dialkylhydantoins in which both of the alkyl groups are, independently, alkyl groups containing from 1 to about 4 carbon atoms. For convenience, this type of N,N=-bromochloro-5,5-dialkylhydantoins is sometimes referred to collectively herein as ABCDAH@.

Non-limiting examples of suitable compounds of this type include, for example, such compounds as 1,3-dichloro-5,5-dimethylhydantoin, 1,3-dichloro-5,5-diethylhydantoin, 1,3-dichloro-5,5-di-n-butylhydantoin, 1,3-dichloro-5-ethyl-5-methylhydantoin, N,N'-bromochloro-5,5-dimethylhydantoin, N,N'-bromochloro-5-ethyl-5-methylhydantoin, N,N'-bromochloro-5-propyl-5-methylhydantoin, N,N'-bromochloro-5-isopropyl-5-methylhydantoin, N,N'-bromochloro-5-butyl-5-methylhydantoin, N,N'-bromochloro-5-isobutyl-5-methylhydantoin, N,N'-bromochloro-5-sec-butyl-5-methylhydantoin, N,N'-bromochloro-5-tert-butyl-5-methylhydantoin, N,N'-bromochloro-5,5-diethylhydantoin, and mixtures of any two or more of the foregoing. N,N'-bromochloro-5,5-dimethylhydantoin is available commercially under the trade designation Bromicide® biocide (Great Lakes Chemical Corporation). Another suitable bromochlorohydantoin mixture is composed predominantly of N,N'-bromochloro-5,5-dimethylhydantoin together with a minor proportion by weight of 1,3-dichloro-5-ethyl-5-methylhydantoin. A mixture of this latter type is available in the marketplace under the trade designation Dantobrom® biocide (Lonza Corporation). Of such products, N,N=-bromochloro-5,5-dimethylhydantoin is a preferred material because of its commercial availability and its suitability for use in the practice of this invention.

The designation N,N' in reference to, say, N,N'-bromochloro-5,5-dimethylhydantoin means that this compound can be (1) 1-bromo-3-chloro-5,5-dimethylhydantoin, or (2) 1-chloro-3-bromo-5,5-dimethylhydantoin, or (3) a mixture of 1-bromo-3-chloro-5,5-dimethylhydantoin and 1-chloro- 3-bromo-5,5-dimethylhydantoin. Also, it is conceivable that some 1,3-dichloro-5,5-dimethylhydantoin and 1,3-dibromo-5,5-dimethylhydantoin could be present in admixture with (1), (2), or (3).

Another suitable and more preferred type of microbiocide for use in the practice of this invention is one or more 1,3-dibromo-5,5-dialkylhydantoins in which one of the alkyl groups is a methyl group and the other is an alkyl group containing from 1 to about 4 carbon atoms. For convenience, this type of 1,3-dibromo-5,5-dialkylhydantoins is sometimes referred to collectively herein as ADBDAH@.

The above preferred 1,3-dibromo-5,5-dialkylhydantoins biocides are exemplified by 1,3-dibromo-5,5-dimethylhydantoin, 1,3-dibromo-5-ethyl-5-methylhydantoin, 1,3-dibromo-5-n-propyl-5-methylhydantoin, 1,3-dibromo-5-isopropyl-5-methylhydantoin, 1,3-dibromo-5-n-butyl-5-methylhydantoin, 1,3-dibromo-5-isobutyl-5-methylhydantoin, 1,3-dibromo-5-sec-butyl-5-methylhydantoin, 1,3-dibromo-5-tert-butyl-5-methylhydantoin, and mixtures of any two or more of them. Of these biocidal agents, 1,3-dibromo-5-isobutyl-5-methylhydantoin, 1,3-dibromo-5-n-propyl-5-methylhydantoin, and 1,3-dibromo-5-ethyl-5-methylhydantoin are, respectively, preferred, more preferred, and even more preferred members of this group from the cost effectiveness standpoint. Of the mixtures of the foregoing biocides that can be used pursuant to this invention, it is preferred to use 1,3-dibromo-5,5-dimethylhydantoin as one of the components, with a mixture of 1,3-dibromo-5,5-dimethylhydantoin and 1,3-dibromo-5-ethyl-5-methylhydantoin being particularly preferred. 1,3-Dibromo-5,5-dimethylhydantoin is especially preferred because of its superior microbiocidal effectiveness, its ready availability in the marketplace, and its suitability for use in the practice of this invention. This compound is available in the marketplace in tablet or granular form under the trade designations XtraBrom® 111 biocide and XtraBrom® 111 T biocide (Albemarle Corporation).

For convenience, in the present disclosure, the above microbiocides are often referred to in the singular or plural as Athe present microbiocidal agent@ or Athe present microbiocidal agents@ as the case may be. The term Athe present microbiocidal agent(s) refers to both singular and plural. Also, the term "active bromine@ or Aactive chlorine@ is the halogen residual that exists in the water upon dissolving in water the particular microbiocidal agent under discussion. The term Aactive halogen@ means Aactive bromine@ or Aactive chlorine@ or both, depending upon the context in which the term is used.

Methods for producing the present microbiocidal agent(s) are known and reported in the literature.

When the present microbiocidal agent(s) is (i) a mixture of two or more individual N,N'-bromochloro-5,5-dialkylhydantoins of the types referred to above, (ii) a mixture of two or more individual 1,3-dibromo-5,5-dialkylhydantoins of the type referred to above, or (iii) a mixture of one or more individual N,N'-bromochloro-5,5-dialkylhydantoins of the type referred to above and one or more individual 1,3-dibromo-5,5-dialkylhydantoins of the type referred to above, the components of the mixture can be in any proportions relative to each other.

One of the features of this invention is the discovery that the bromine residues in water resulting from the addition thereto of the present microbiocidal agent(s) are substantially less thermally stable than the chlorine residues resulting from the addition to water of sodium hypochlorite, a microbiocide that is widely used in water used in the processing of poultry for food. Indeed, the bromine residues in water resulting from the addition thereto of the present microbiocidal agent are substantially less thermally stable than the bromine residues from a sulfamate-stabilized bromine-based microbiocide formed by interaction in water of bromine chloride and sulfamic acid or a water soluble sulfamate salt, a highly effective, commercially available microbiocide.

As a consequence of this discovery, the present microbiocidal agent(s) when added downstream from the scalding operation produces active bromine which can exert its microbiocidal effectiveness in controlling microorganisms in the downstream operation(s) to which the present microbiocidal agent(s) has/have been added. Furthermore, instead of sending the bromine-residual-containing effluent aqueous medium from such downstream operation(s) to the waste water treating facility where a considerable amount of the microorganisms in the BOD operation are destroyed by the bromine residues in the effluent, pursuant to this invention the bromine-residual-containing effluent aqueous medium from one or more such downstream operations is recycled to the scalding operation. This, in turn, provides the following dual benefits: First, a significant portion of the bromine residues from the present microbiocidal agent(s) is/are thermally decomposed at the elevated temperatures existing in the scalding water. Thus, on transferring the effluent from the scalding operation to the BOD reducing operation, the amount of microorganism destruction occurring in the BOD reducing operation is significantly reduced as compared to that which would occur from the transfer to the BOD reducing operation of the effluent from one or more of the downstream operations containing the original bromine residues. Secondly, the recycle of the effluent from the downstream operations containing the original bromine residues to the scalding operation reduces the amount of water used in the overall processing of the poultry for food. Thus, when adding the present microbiocidal agent(s) to more than one downstream operation, it is preferred to recycle the effluents from all of the downstream operations in which the present microbiocidal agent(s) was/were employed because this increases the amount of water that is recycled to and through the scalding operation and thus reuses this larger quantity of water before disposal. Note also that the effluent recycled to and through the scalding operation contributes microbiocidal action to the feathered carcasses in the scalding operation.

The aqueous microbiocidal solutions used in this invention can be formed in many cases by adding one or more of the present microbiocidal agents in undiluted finely divided or powdery form to water being used or to be used in one or more poultry processing operations located downstream from the scalding operation. Alternatively, water flowing to a poultry processing operation located downstream from the scalding operation can be pre-contacted in a feeding device containing granular, nugget, pellet, tablet or other non-powdery particulate form of one or more of the present microbiocidal agents disposed in a canister, tank, or other similar vessel.

If desired, the present microbiocidal agent(s) can be dissolved in a suitable innocuous, harmless, water-soluble organic solvent with or without water to form a solution which can be added to the water utilized at one or more appropriate downstream processing operations of the poultry processing process. One such innocuous, harmless, water-soluble organic solvent, which non-toxic, at least at the dosage levels involved, such is acetonitrile.

By virtue of the recycle pursuant to this invention, feathered poultry carcasses which are contacted with a hot aqueous solution which contains a residual microbial inhibiting amount of active bromine. The contact between the hot aqueous solution and the feathered poultry carcass (a) facilitates subsequent defeathering of the carcasses, (b) controls contamination of the carcasses by microorganisms, (c) reduces the amount of halogen residual in the hot aqueous solution.

The amount (concentration) of the selected microbiocide utilized in the practice of this invention will vary depending on various factors such as the particular microbiocide being used, the nature and frequency of prior microbiocidal treatments, the types and nature of the microorganisms present, the amount and types of nutrients available to the microorganisms, the nature and extent of cleansing actions, if any, taken in conjunction with the microbiocidal treatment, the surface or locus of the microorganisms being treated, and so on. In any event, a microbiocidally-effective amount of the aqueous solution of the microbiocide of this invention will be applied to or contacted with the microorganisms. In the case of DBDAH, typically the diluted solution will contain a microbiocidally-effective amount of active halogen, measured as bromine, in the range of about 2 to about 600 ppm (wt/wt), preferably in the range of about 2 to about 300 ppm (wt/wt), and more preferably in the range of about 5 to about 100 ppm (wt/wt), active halogen being determinable by use of the conventional DPD test procedure. In the case of BCDAH, the corresponding ranges are about 2 to about 1000 ppm (wt/wt), preferably about 2 to about 600 ppm (wt/wt) and more preferably about 8 to about 200 ppm (wt/wt) as active bromine. If the actual active halogen in the solution consists of active chlorine, the concentration of the diluted solution used is preferably at least two to three times higher than the minimums of the foregoing ranges. In the case of the 1,3-dibromo-5,5-dialkylhydantoins used pursuant to this invention, a particularly preferred range for use is in the range of about 5 to about 70 ppm (wt/wt) of active bromine. When contacting poultry carcasses or edible parts thereof with aqueous solutions formed from at least one 1,3-dibromo-5,5-dialkylhydantoin used pursuant to this invention, it is especially preferred to use in the water for washing or otherwise contacting the poultry carcasses or edible parts thereof, a microbiocidally effective amount of active bromine that does not significantly or appreciably bleach the skin of the carcass or have a significant or appreciable adverse effect upon the taste of cooked meat from the poultry such as the breast meat and thigh meat. Such amount is typically within the range of about 0.5 to about 150 ppm (wt/wt) or when smaller amounts are used, within the range of about 0.5 to about 100 ppm (wt/wt) of active bromine as determinable by the DPD test procedure. It will be understood that departures from the foregoing ranges can be made whenever deemed necessary or desirable, and such departures are within the spirit and scope of this invention.

Figure 2:
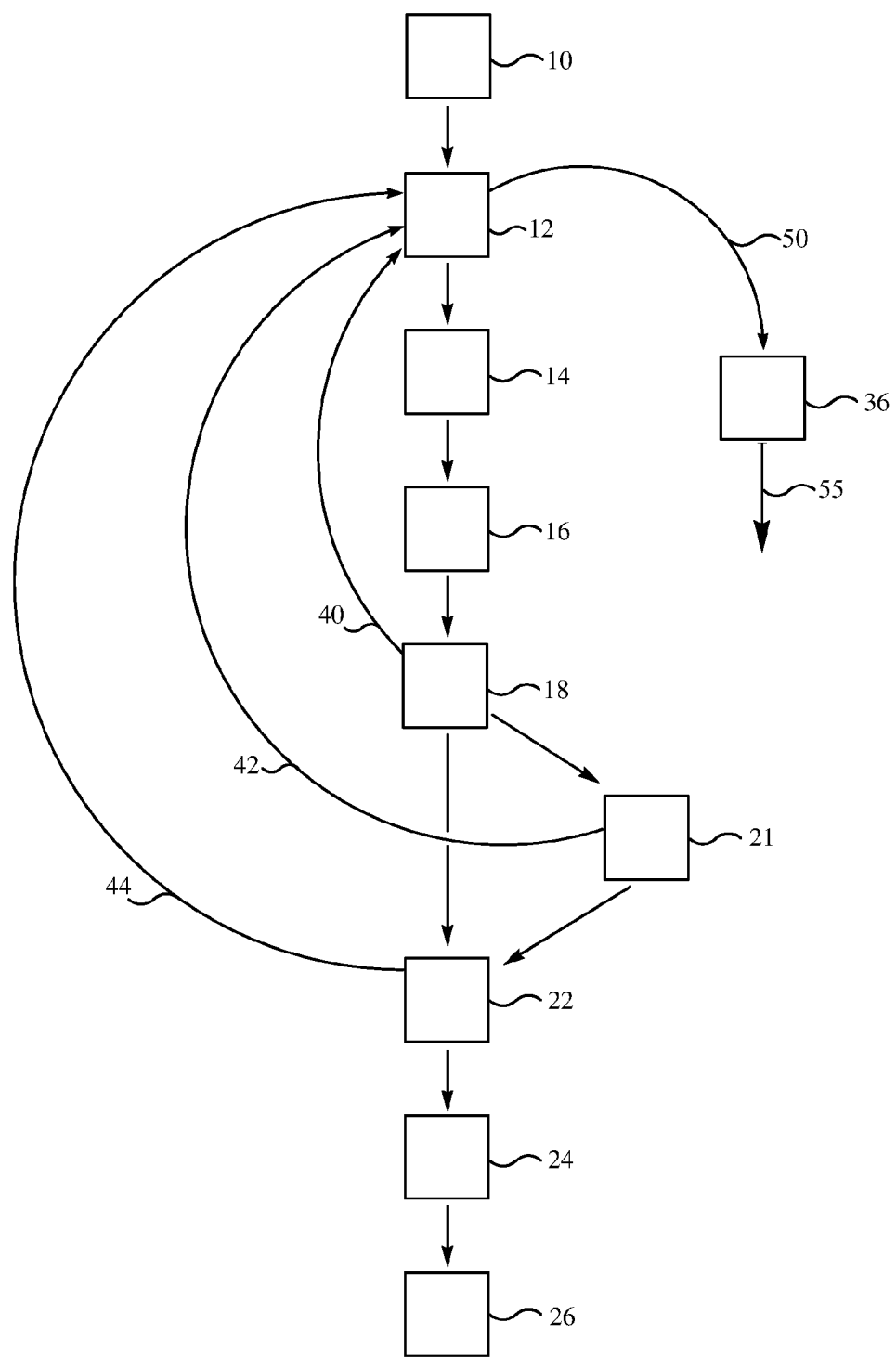
FIG. 2 is a block diagram showing the poultry processing operations of another typical processing line in a facility processing poultry for food and illustrating various preferred recycling operations made possible by this invention to achieve the advantageous results made possible by this invention.

Referring now to the drawings, which are illustrative but not restrictive, the block diagram of FIGS. 1 and 2 illustrate the apparatus, equipment, devices and/or stations through which the poultry typically pass during the processing operation. Thus, the downwardly directed successive lines from 10 to 12 to 14 to 16, etc., illustrate a typical flow path of the poultry from stage to stage or operation to operation. It will be appreciated that the Drawings relate both to highly automated processing lines as exist in high speed, high production processing facilities, and to processing operation in facilities wherein some of the operations are conducted by use of hand-held equipment such as hand-held sprays.

In the systems depicted in FIGS. 1 and 2, the first operation shown, 10, comprises apparatus or facilities in which the birds are stunned and killed. This is followed by scalding vessel or tank 12 in which the feathered birds are contacted with hot aqueous medium in order to loosen the feathers, picker apparatus or station 14 where feathered birds from 12 are defeathered such as by beaters or other means to rid the carcass of the loosened feathers, and evisceration apparatus or station 16 where the carcasses are opened and the viscera removed, either automatically or manually. The next apparatus or facility shown is an inside-outside bird washing (IOBW) facility 18 where the open carcasses are washed with aqueous sprays, typically suitably powerful aqueous jet sprays, the washing again taking place either in automated mechanical facilities or by use of hand-held sprays. The sprayed carcasses are then passed either to a continuous on-line processing facility or station (COP) 20 (see FIG. 1) or when needed, to off-line reprocessing facility or station 21 (see FIG. 2). Next, the carcasses optionally are passed to prechill spray apparatus or a prechill spray facility 22 in which a spray of aqueous medium is applied to the carcasses to remove residues from any prior operation and in some cases to reduce their temperature. From apparatus or facility 22, if used, or from facility or station 20 or 21, the carcasses are passed into a chill tank or other chilling vessel 24 in which they remain for a sufficient period of time to become thoroughly chilled. Optionally, the chilled carcasses are then subjected to post-chill dip or spray apparatus or facilities 26 where residues remaining on the carcasses are rinsed away by contact with a bath and/or sprays of water.

In FIG. 2, the flow path of the poultry carcasses from IOBW facility 18 as shown either leads directly to prechill spray facility 22 or first to off-line reprocessing facility or station 21 and thence to prechill spray facility 22. This illustrates the fact that governmental regulations, at least in the United States, require that if the carcasses from IOBW facility 18 carry residual fecal matter or the like, the carcasses must go to facility or station 21 where the contamination is removed by appropriate spraying means. The so-cleansed carcasses then proceed to prechill spray facility 22. On the other hand, if the carcasses from IOBW facility 18 are not so-contaminated, they can proceed directly to prechill spray facility 22.

Pursuant to this invention, a microbiocidal quantity of the present microbiocidal agent(s) is/are provided in any appropriate way to the water entering and/or to be used in any facility, apparatus, device, station, or operation downstream from scalding vessel or tank 12. Preferably, the present microbiocidal agent(s) is/are provided in any suitable way to the water entering and/or to be used in inside-outside bird washing (IOBW) facility 18, or to continuous on-line processing facility or station 20 or to off-line reprocessing facility or station 21, or to prechill spray apparatus or prechill spray facility 22, if used. Also pursuant to this invention, aqueous effluent from any facility, apparatus, device, station, or operation downstream from the place where a microbiocidal quantity of the present microbiocidal agent(s) is/are provided, is recycled to scalding vessel or tank 12 wherein the present microbiocidal agent(s) typically contribute(s) microbiocidal activity while also undergoing at least partial thermal decomposition. In the preferred embodiments depicted, the recycles shown are effluents from an inside-outside bird washing (IOBW) facility 18, or from a continuous on-line processing facility or from station 20 or from an off-line reprocessing facility or station 21, or from prechill spray apparatus or prechill spray facility 22, if used, or any combination of two or more of these. Such recycle streams are represented schematically in FIG. 1 by lines 30, 32, 34, and in FIG. 2 by lines 40, 42, 44. It will be appreciated that any such line can be directly attached either to one or more such facilities or stations themselves or from an effluent line extending from one or more of these facilities or stations.

Effluent from scalding vessel or tank 12 is passed or allowed to pass to a waste water purification operation 36 wherein microbial action is utilized to reduce the biochemical oxygen demand of this effluent whether by itself or in combination with effluent waste water from other stages or operations in the overall poultry processing process. After treatment in waste water purification operation 36, the treated waste water is released to the environment as indicated by line 55. It will be appreciated that in typical poultry processing facilities effluent waste water from various individual stages are also passed or allowed to pass to waste water purification operation 36 either as individual streams or more commonly as an overall combined stream into which waste water effluent from scalding vessel or tank 12 is passed or allowed to pass. Thus, line 50 should not be construed as requiring a separate line from scalding vessel or tank 12 to waste water purification operation 36. Instead, line 50 merely represents the fact that waste water from scalding vessel or tank 12, whether by itself in a separate line or in a mixture of waste water effluents emanating from other stages in the processing line, is sent to water purification operation 36.

There are two different types of procedures that are used for determining active halogen content, whether active chlorine, active bromine or both. For measuring concentrations in the vicinity of above about, say, 1000 ppm or so (wt/wt) of active bromine or, say, above about 500 ppm of active chlorine, starch-iodine titration is the preferred procedure. On the other hand, where concentrations are below levels in these vicinities, the conventional DPD test procedure is more suitable, as this test is designed for measuring very low active halogen concentrations, e.g., active chlorine concentrations in the range of from zero to about 5 ppm (wt/wt) or active bromine concentrations in the range of from zero to about 10 ppm (wt/wt). In fact, where the actual concentration of active chlorine is between, say, about 5 ppm and about 500 ppm (wt/wt), or where the actual concentration of active bromine is between, say, about 10 ppm and about 500 ppm (wt/wt), the test sample is typically diluted with pure water to reduce the actual concentration to be in the range of about 1 to about 5 ppm in the case of active chlorine and to be in the range of about 1 to about 10 ppm in the case of active bromine before making the DPD analysis. It can be seen therefore that while there is no critical hard-and-fast concentration dividing line between which procedure to use, the approximate values given above represent a practical approximate dividing line, since the amounts of water dilution of more concentrated solutions when using the DPD test procedure increase with increasing initial active halogen concentration, and such large dilutions can readily be avoided by use of starch-iodine titration when analyzing the more concentrated solutions. In short, with suitably dilute solutions use of the DPD test procedure is recommended, and with more concentrated solutions use of starch-iodine titration is recommended.

The starch-iodine titration procedure for determination of active halogen has long been known. For example, chapter XIV of Willard-Furman, *Elementary Quantitative Analysis*, Third Edition, D. Van Nostrand Company, Inc., New York, Copyright 1933, 1935, 1940 provides a description of starch-iodine titration. While details of standard quantitative analytical procedures for determination of active halogen in such product solutions by starch-iodine titration may vary from case to case, the results are normally sufficiently uniform from one standard procedure to another as not to raise any question of unreliability of the results. A recommended starch-iodine titration procedure is as follows: A magnetic stirrer and 50 milliliters of glacial acetic acid are placed in an iodine flask. The sample (usually about 0.2-0.5 g) for which the active halogen is to be determined is weighed and added to the flask containing the acetic acid. Water (50 milliliters) and aqueous potassium iodide (15%, wt/wt; 25 milliliters) are then added to the flask. The flask is stoppered using a water seal. The solution is then stirred for fifteen minutes, after which the flask is unstoppered and the stopper and seal area are rinsed into the flask with water. An automatic buret (Metrohm Limited) is filled with standardized 0.1 normal sodium thiosulfate. The solution in the iodine flask is titrated with the 0.1 normal sodium thiosulfate; when a faint yellow color is observed, one milliliter of a 1 wt % starch solution in water is added, changing the color of the solution in the flask from faint yellow to blue. Titration with sodium thiosulfate continues until the blue color disappears. The amount of active halogen is calculated using the weight of the sample and the volume of sodium thiosulfate solution titrated. In this way, the amount of active halogen such as active chlorine or active bromine in an aqueous product solution, regardless of actual chemical form, can be quantitatively determined.

The standard DPD test for determination of low levels of active halogen is based on classical test procedures devised by Palin in 1974. See A. T. Palin, "Analytical Control of Water Disinfection With Special Reference to Differential DPD Methods For Chlorine, Chlorine Dioxide, Bromine, Iodine and Ozone", *J. Inst. Water Eng.,* 1974, 28, 139. While there are various modernized versions of the Palin procedures, the recommended version of the test is fully described in *Hach Water Analysis Handbook,* 3rd edition, copyright 1997. The procedure for "total chlorine" (i.e., active chlorine) is identified in that publication as Method 8167 appearing on page 379, Briefly, the "total chlorine" test involves introducing to the dilute water sample containing active halogen, a powder comprising DPD indicator powder, (i.e., N,N'-diethyldiphenylenediamine), KI, and a buffer. The active halogen species present react(s) with KI to yield iodine species which turn the DPD indicator to red/pink. The intensity of the coloration depends upon the concentration of "total chlorine" species (i.e., active chlorine") present in the sample. This intensity is measured by a colorimeter calibrated to transform the intensity reading into a "total chlorine" value in terms of mg/L as $Cl_2$. If the active halogen present is active bromine, the result in terms of mg/L as $Cl_2$ is multiplied by 2.25 to express the result in terms of mg/L as $Br_2$ of active bromine.

In greater detail, the DPD test procedure is as follows:
1. To determine the amount of species present in the water which respond to the "total chlorine" test, the water sample should be analyzed within a few minutes of being taken, and preferably immediately upon being taken.
2. Hach Method 8167 for testing the amount of species present in the water sample which respond to the "total chlorine" test involves use of the Hach Model DR 2010 colorimeter. The stored program number for chlorine determinations is recalled by keying in "80" on the keyboard, followed by setting the absorbance wavelength to 530 nm by rotating the dial on the side of the instrument. Two identical sample cells are filled to the 10 mL mark with the water under investigation. One of the cells is arbitrarily chosen to be the blank. To the second cell, the contents of a DPD Total Chlorine Powder Pillow are added. This is shaken for 10-20 seconds to mix, as the development of a pink-red color indicates the presence of species in the water which respond positively to the DPD "total chlorine" test reagent. On the keypad, the SHIFT TIMER keys are depressed to commence a three minute reaction time. After three minutes the instrument beeps to signal the reaction is complete. Using the 10 mL cell riser, the blank sample cell is admitted to the sample compartment of the Hach Model DR 2010, and the shield is closed to prevent stray light effects. Then the ZERO key is depressed. After a few seconds, the display registers 0.00 mg/L $Cl_2$. Then, the blank sample cell used to zero the instrument is removed from the cell compartment of the Hach Model DR 2010 and replaced with the test sample to which the DPD "total chlorine" test reagent was added. The light shield is then closed as was done for the blank, and the READ key is depressed. The result, in mg/L $Cl_2$ is shown on the display within a few seconds. This is the "total chlorine" level of the water sample under investigation.

In the practice of this invention the microbiocidal system can be used in various ways. For example, a microbiocidally effective amount of a microbiocide of this invention is applied to the locus of the microorganisms to be eradicated or controlled so that the microbiocidal system comes in contact with these microorganisms. The application can be made by thorough application by pouring, spraying, wet mopping, flooding, and/or wet wiping infested or potentially infested surfaces or areas of the processing equipment and environs such as flooring, walls, tables, conveyors, stanchions, conduits, tanks, and drains with a biocidally-effective amount of an aqueous solution of the microbiocide. Where applicable and possible, portions of the processing apparatus can be immersed in an aqueous solution of the microbiocide, with temporary disassembly, if necessary. Such applications should be conducted routinely on a frequency sufficient to ensure that exposure of the poultry being processed to dangerous microorganisms, such as bacteria and biofilms is prevented to the greatest extent possible. For best results these operations should be conducted in conjunction or association with thorough cleaning operations such as scrubbing, scouring, scraping and, otherwise removing infestations of biofouling or biofilms, whether visible or invisible. After contacting the microorganisms with the microbiocide for a suitable period of time to ensure penetration into polysaccharide slimes and other defense mechanisms of various species of these microorganisms, the entire disinfected area should be washed, e.g., hosed down, with clean water and preferably the washings themselves should be disinfected with additional microbiocide of this invention before discharge. The contact times will of course vary depending upon the frequency and thoroughness of the cleaning and disinfection operations and the identity and concentration of the particular microbiocidal solution being employed. Generally speaking contact times may fall in the range of from about a few minutes to a few hours, but any period of time that effects the eradication or control of the microbial population in the poultry processing areas should be used and is within the scope of this invention.

Another mode of applying the microbiocidally-effective amounts of solid-state microbiocides of these embodiments of the invention is to cause the microbiocide to be leached into water streams passing through conduits and into tanks or other washing devices utilized in the processing of the poultry. For example, suitable solid forms of the microbiocide such as tablets, briquettes, pellets, nuggets, or granules are placed in suitable feeding devices through which a stream of water is passed. The passage of the water through the bed of the microbiocide results in the stream continuously dissolving small quantities of the microbiocide to thereby provide microbiocidally effective amounts of the microbiocide in the water. 1,3-Dibromo-5,5-dimethylhydantoin is especially preferred for use in this mode of application because of its relatively low solubility and its very high microbiocidal effectiveness even at low concentrations. The relatively low water solubility of 1,3-dibromo-5,5-dimethylhydantoin thus provides a relatively slow rate of dissolution in water at ambient room temperatures. This translates into relatively long periods of use before need of refilling the device holding the solids. By way of example, the solubility of 1,3-dibromo-5,5-dimethylhydantoin in water at 75 EF (ca. 24 EC) is 405 ppm expressed as $Cl_2$ whereas the solubilities of N,N'-bromochloro-5,5-dimethylhydantoin and of the commercial mixture of N,N'-bromochloro-5,5-dimethylhydantoin and 1,3-dichloro-5-ethyl-5-methylhydantoin at the same temperature are, respectively, 890 ppm and 1905 ppm, both expressed as $Cl_2$.

An especially cost-effective, operationally efficient, and highly preferred way of forming aqueous microbiocidal solutions of one or more 1,3-dibromo-5,5-dialkylhydantoins in which one of the alkyl groups is a methyl group and the other alkyl group contains in the range of 1 to about 4 carbon atoms, most preferably 1,3-dibromo-5,5-dimethylhydantoin, ("dibromodialkylhydantoin(s)") comprises passing water through a bed of one or more such dibromodialkylhydantoin(s) in granular, nugget, pellet, tablet or other non-powdery particulate form ("bed") disposed in a canister, tank, or other similar vessel ("tank"). Preferably the tank has a pressure sealable port at its upper portion for periodically replenishing the contents of the bed, and the water is caused to flow upwardly through a portion of the bed. More preferably, the tank is elongated in an upward direction so that the bed is longer from top to bottom than from side to side, this upward water flow is dispensed into the bed to flow upwardly through only a lower portion of the bed, and thence substantially horizontally through a port disposed between the lower and the upper portions of the bed and tank. In this way the upper portion of the bed serves as a reserve supply of contents of the bed which automatically feeds into the lower portion of the bed under gravity as the lower portion of the bed is slowly but substantially uniformly dissolved away in the water flow. Thus in this operation the water flow is preferably at least a substantially continuous flow, and most preferably, is a continuous flow. Methods for producing granules, tablets or other non-powdery particulate forms of 1,3-dibromo-5,5-dimethylhydantoin are described in detail in commonly-owned copending applications PCT/US 01/01541, 01/01545, and 01/01585, all filed Jan. 17, 2001, each claiming priority based on respective earlier-filed corresponding U.S. applications. Excellent process technology for producing 1,3-dibromo-5,5-dimethylhydantoin for use in making such granules, tablets or other non-powdery particulate forms is described in detail in commonly-owned copending application PCT/US 01/01544, filed Jan. 17, 2001, claiming priority based on an earlier-filed corresponding U.S. application. The disclosures of each such PCT and U.S. application is incorporated herein by reference. Particularly preferred apparatus for use in conjunction with such granules, tablets or other non-powdery particulate forms of these dibromodialkylhydantoin(s) in forming aqueous microbiocidal solutions thereof is available from Neptune Chemical Pump Company, a division of R.A. Industries, Inc., Lansdale, Pa. 19446, as "Bromine Feeders" Models BT-15, BT-40, BT-42, BT-80, BT-160, BT-270, and BT-350, or equivalent. Excellent results are achieved using combinations of Model BT-40 with granules or nuggets of 1,3-dibromo-5,5-dimethylhydantoin (XtraBrom® 111 biocide) available from Albemarle Corporation. Single charges of such microbiocides in tablet or granular form in such device can provide continuous highly-effective microbiocidal activity in bodies of end use water at ordinary outdoor temperatures for as long as five (5) months without need for replenishment.

Another suitable method of effecting contact between the microbiocide and the microorganisms is to pump an aqueous solution containing a microbiocidally-effective amount of the microbiocide through the conduits and into the tanks or other washing devices, such as scalding tanks and chill tanks, utilized in the processing of the poultry. Variants of this procedure include dispensing portion-wise as by gravity dripping an aqueous solution of the microbiocide directly into a tank or other vessel in which poultry are to be or are being processed.

Preferably two or more of the foregoing methods of application of the microbiocides of this invention are used. Thus in a preferred embodiment a microbiocide of these embodiments of the invention is applied by (i) periodically contacting at least portions, if not all, of the poultry processing apparatus to disinfection or sanitization with a microbiocidally-effective amount of an aqueous solution of at least one of the above 1,3-dibromo-5,5-dialkylhydantoins, and (ii) contacting the exposed surfaces of the poultry with a microbiocidally-effective amount of an aqueous solution of at least one of the above 1,3-dibromo-5,5-dialkylhydantoins, before and/or after, preferably after, dispatching the fowl, and most preferably after defeathering the fowl. In another preferred embodiment, a microbiocide of these embodiments of the invention is applied by (i) periodically contacting at least portions, if not all, of the poultry processing apparatus to disinfection or sanitization with a microbiocidally-effective amount of an aqueous solution of at least one the above 1,3-dibromodialkylhydantoins, and (ii) contacting the edible portions and/or internal organs of the dispatched fowl with a microbiocidally-effective amount of an aqueous solution of at least one of the above 1,3-dibromo-5,5-dialkylhydantoins.

Particularly preferred processes of this invention are those wherein the fowl are processed by a series of steps which comprise the following: (a) suspending the fowl in moving clamps or shackles, (b) stunning, but not killing, the fowl such as by use of a suitable gas, or by contacting at least the heads of the fowl with a water-applied electric shock to stun the fowl, e.g., by immersing the heads in a water bath carrying a suitable current to effect the stunning, (c) cutting the jugular veins and/or carotid arteries at the neck of the stunned fowl either manually with a knife or automatically with a mechanical cutting device, (d) draining blood from the carcasses, (e) scalding the birds with hot water, e.g., in a scalding tank, to facilitate feather removal, (f) defeathering the fowl, (g) removing the heads and feet from the fowl, (h) eviscerating the fowl either manually with a knife, or automatically with mechanical evisceration apparatus, (i) separating the viscera from the carcasses, (j) washing the carcasses, and (k) chilling the carcasses, e.g., in water such as by passage of the carcasses through at least one and often two chill tanks, or by air chilling. The scalding step will typically be conducted at water temperatures in the range of about 50 to about 65 EC, with the lower temperatures being preferred for retention of normal yellow-colored skin. The higher temperatures will more usually be used in connection with turkeys and spent egg-layer hens. The chilling temperatures used will typically reduce the carcass temperature to below about 4 EC, with final temperatures of the finished carcasses for shipment being as low as about −2 EC. Other steps can be included and in some cases one or more of the steps (a) through (j) may be altered or revised or the sequence of the steps may to some extent be altered or revised, to adapt to given circumstances. Examples of extra steps that may be included are inspection steps, e.g., by governmental regulatory personnel, and wax-dipping in the case of water fowl to enhance the extent of defeathering. Inspections are often conducted subsequent to the evisceration step, such as before separating the viscera from the carcasses. Wax dipping will typically be used when processing waterfowl, the feathers of which typically are more difficult to remove than, say, chickens. Wax dipping will typically be performed directly after use of feather-picking machines which utilize rubber "fingers" to beat off the feathers. The wax dipping step will typically involve dipping the partially defeathered carcass into a molten wax contained in a tank, allowing the wax to harden on the carcass, and then removing the wax coating as by peeling it off along with feathers embedded in the wax. This operation can be repeated as desired, before proceeding to the next step in the process, e.g., removal of the heads and feet. One illustrative example of a suitable revision of the sequence of steps, would be to conduct step (g) before step (d) instead of after step (f). Upon a reading of this disclosure, other suitable sequence revisions may well become obvious to one of ordinary skill in the art, and thus need not be further elaborated upon here.

In the above processing, the microbiocidal action of the microbiocides of these embodiments of the invention, preferably one or more applicable bromine-based microbiocides used pursuant to this invention, can be applied at any of a variety of suitable stages in the operation. For example, an applicable microbiocidal solution of this invention can be applied to any or all of the processing equipment used including knives, conveying apparatus, the surfaces of emptied scaling tanks, defeathering apparatus, (e.g., rubber "fingers" etc.), knives and mechanical apparatus used for cutting or eviscerating the fowl, all surfaces that come in contact with the blood or the viscera of the fowl, including tables, conveyor belts, etc., and all surfaces that come in contact with the carcasses after separation of the viscera therefrom. The applicable sanitizing solutions of this invention can be applied to by immersion, spraying, flooding, or any other way of ensuring that the microbiocidally-effective solution contacts the surfaces that contain or are exposed to the undesirable microorganisms such as bacteria and/or biofilm (biofouling).

Automated dispensing equipment suitable for use in dispensing the microbiocides of this invention has been described in the literature and to at least some extent is available in the marketplace. For a reference to such equipment, see for example U.S. Pat. No. 5,683,724 wherein an automated dispensing system is described.

As noted above, the reduction in the amount of halogen residual in the hot aqueous solution appears to be caused in part by the low thermal stability in hot water of the solute formed in water on dissolving a 1,3-dihalo-5,5-dialkylhydantoin in water. In fact, it has been found, quite surprisingly, that the solutes of 1,3-dibromo-5,5-dialkylhydantoin and of N,N=-bromochloro-5,5-dialkylhydantoin are significantly less thermally stable in hot water than is the solute of the conventional widely-used chlorine-based microbiocide, sodium hypochlorite. Indeed, the solutes of 1,3-dibromo-5,5-dialkylhydantoin and of N,N=-bromochloro-5,5-dialkylhydantoin were found to be less thermally stable than the stabilized bromine microbiocide produced from bromine chloride and sulfamate anion (Stabrom® 909 biocide; Albemarle Corporation).

In particular, experiments were carried out in which water at a pH of 7.0 was heated to approximately 140 EF (60 EC) and then either (i) sodium hypochlorite, (ii) a concentrated alkaline aqueous solution produced from bromine chloride and sulfamate anion (Stabrom® 909 biocide; Albemarle Corporation), for convenience referred to as SSBC, (iii) 1,3-dibromo-5,5-dimethylhydantoin, or (iv) N,N=-bromochloro-5,5-dimethylhydantoin was added to form a solution. The resultant solutions were kept at the same temperature for extended periods of time while periodically taking samples to determine halogen content as total chlorine in parts per million (wt/wt). The same procedure was carried out in which the water was kept at room temperature, this group of experiments serving as a control. The results of these experiments are summarized in Tables 1-4. In Table 1, the values given are ppm (wt/wt) of total chlorine in the solution. In Tables 2, 3, and 4, the values given are ppm (wt/wt) of total bromine in the solution.

TABLE 1

| Time | Control - Sodium Hypochlorite Microbiocide, Solution Held at Room Temperature | Sodium Hypochlorite Microbiocide, Solution Held at 140EF |
| --- | --- | --- |
| Initial | 54 | 56 |
| 1 hour |  | 55 |
| 1 hour, 40 minutes | 52 |  |
| 2 hours |  | 55 |
| 3 hours, 25 minutes | 52 |  |
| 21 hours |  | 51.5 |
| 22.5 hours | 54 |  |
| 47 hours |  | 49 |
| 8 days | 49 |  |

TABLE 2

| Time | Control SSBC Microbiocide, Solution Held at Room Temperature | SSBC Microbiocide, Solution Held at 140EF |
| --- | --- | --- |
| Initial | 105 | 108 |
| 3 hours, 10 minutes |  | 107 |
| 3 hours, 15 minutes | 105 |  |
| 4 hours, 40 minutes | 106 | 104 |
| 21 hours, 55 minutes |  | 105 |
| 22 hours | 110 |  |
| 118 hours | 107 | 99 |

TABLE 3

| Time | Control - 1,3-Dibromo-5,5-dimethylhydantoin Microbiocide, Solution Held at Room Temperature | 1,3-Dibromo-5,5-dimethylhydantoin Microbiocide, Solution Held at 140EF |
| --- | --- | --- |
| Initial | 94 | 91 |
| 1 hour, 35 minutes | 98 |  |
| 2 hours, 20 minutes |  | 78 |
| 4 hours, 20 minutes | 95 | 65 |
| 22.5 hours | 88 | 20 |
| 48 hours | 68 |  |

TABLE 4

| Time | Control - N,N =-Bromochloro-5,5-dimethylhydantoin Microbiocide, Solution Held at Room Temperature | N,N = -Bromochloro-5,5-dimethylhydantoin Microbiocide, Solution Held at 140EF |
| --- | --- | --- |
| Initial | 82 | 93 |
| 1 hour, 55 minutes | 77 |  |
| 2 hours, 5 minutes |  | 68 |
| 3 hours, 55 minutes | 74 |  |
| 4 hours, 5 minutes |  | 58 |
| 6 hours, 55 minutes |  | 54 |
| 23 hours, 30 minutes | 65 |  |
| 23 hours, 35 minutes |  | 27 |

In the practice of this invention, it can prove useful to utilize combinations of different sanitizing steps using different microbiocidal agents, at least one of which is a microbiocide of this invention, viz., (i) at least one DBDAH, or (ii) at least one BCDAH, or (iii) both of (i) and (ii). For example, a microbiocide of this invention, preferably a bromine-based microbiocide of (i) can be applied to or contacted with various surfaces associated with the poultry processing such as conduits, tanks (e.g., the scalding tank(s), chill tank(s), conveyor belts or conveyor lines, and the poultry carcasses themselves can be treated with an antimicrobial agent such as solutions or gels containing carboxylic acids (e.g., acetic or lactic acid) and/or peroxycarboxylic acids, such as peracetic acid, peroxyoctanoic acid, peroxydecanoic acid, or the like. Use of such carboxylic acids is described for example in U.S. Pat. No. 6,113,963. The result of such combined operations is highly effective sanitization. In fact, it is contemplated that this combination of operations will result in a greater extent of microbiological eradication than has been generally achievable heretofore, especially when the bromine-based biocide used is 1,3-dibromo-5,5-dimethylhydantoin and the carboxylic acid used is peracetic acid. Indeed the combined effect of these microbiocides may be synergistic.

Another microbiocide which can be utilized in combined operations pursuant to this invention is trisodium phosphate a material which according to Capita et al., *Meat Science*, 2000, 55 (4), 471-474, has been approved by the USDA as an aid to eliminate *Salmonella* on raw poultry carcasses. In the combined operations trisodium phosphate is applied to the poultry carcasses, and one or more of the microbiocides of this invention, preferably one or more of the bromine-based microbiocides of this invention, are utilized in sanitizing the equipment, instruments, and/or apparatus associated with the processing of the poultry. Also pursuant to this invention the combined operations can utilize chlorine dioxide treatments along with use of the microbiocides of this invention. Smith, *Meat Processing*, 1996, 35(10), 47 indicates that chlorine dioxide had been approved by the US FDA for use in poultry processing water, and in the practice of this invention one or more microbiocides of this invention, preferably one or more of the microbiocides of this invention, viz., (i) at least one DBDAH, or (ii) at least one BCDAH, or (iii) both of (i) and (ii) are utilized in sanitation of various items of equipment, instruments, and/or apparatus utilized in the processing of the poultry, and chlorine dioxide is used to sanitize at least some of the poultry processing water.

Instead of utilizing only (i) at least one DBDAH, or (ii) at least one BCDAH, or (iii) both of (i) and (ii), in a processing operation pursuant to this invention, mixtures or combinations of at least one of (i), (ii), or (iii) with at least one other microbiocidal agent such as, for example, trisodium phosphate, sodium hypochlorite, chlorine dioxide, trichloroisocyanurate, or other suitable microbiocides may be utilized. In such mixtures any proportions can be used, but preferably the amount of at least one of (i), (ii), or (iii) in the mixture will be at least about 50 wt %.

The adjective "aqueous" means that the solution or medium or whatever other noun the adjective modifies, can be water whether highly purified or of ordinary purity such as emanates from the faucet. Since we are dealing with processing of food, it stands to reason that one should not use unfit, contaminated or poisonous water. Besides naturally-occurring trace impurities that may be present in, say, potable water in general, such as ordinary well water or municipal water, the adjective "aqueous" also permits the presence in the water of trace amounts of dissolved salts such as fluoride often added to municipal water systems. The point here is that the term "aqueous" does not restrict the medium or solvent to absolutely pure water—the aqueous solution or medium or the like can contain what would normally be present and/or reasonably be expected to be present in it under the particular circumstances involved when employing water using ordinary common sense.

Compounds referred to by chemical name or formula anywhere in this document, whether referred to in the singular or plural, are identified as they exist prior to coming into contact with another substance referred to by chemical name or chemical type (e.g., another component, a solvent, or etc.). It matters not what chemical changes, if any, take place in the resulting mixture or solution, as such changes are the natural result of bringing the specified substances together under the conditions called for pursuant to this disclosure. As an example, the phase "solution of at least one 1,3-dihalo-5,5-dialkylhydantoin" and phrases of similar import signify that just before being brought into contact with an aqueous medium such as water, the at least one 1,3-dihalo-5,5-dialkylhydantoin referred to was the specified 1,3-dihalo-5,5-dialkylhydantoin. The phrase thus is a simple, clear way of referring to the solution, and it is not intended to suggest or imply that the chemical exists unchanged in the water. The transformations that take place are the natural result of bringing these substances together, and thus need no further elaboration.

Also, even though the claims may refer to substances in the present tense (e.g., "comprises", "is", etc.), the reference is to the substance as it exists at the time just before it is first contacted, blended or mixed with one or more other substances in accordance with the present disclosure.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

What is claimed is:

1. An apparatus for processing poultry for food in a plurality of processing operations, wherein the apparatus comprises at least:
    (a) a scalding vessel or station in which feathered poultry carcasses are contacted with a hot aqueous medium;
    (b) picker apparatus or de-feathering station in which feathers are removed from the feathered poultry carcasses;
    (c) eviscerating apparatus or an eviscerating station in which de-feathered carcasses are eviscerated;
    (d) inside-outside bird washing apparatus or station wherein the insides and the outsides of eviscerated poultry carcasses are cleansed with one or more streams of an aqueous medium
    (e) a continuous online processing operation or station wherein both the inside and the outside of the poultry carcasses are sprayed, or an offline reprocessing operation wherein both the inside and the outside of the poultry carcasses are sprayed; and
    (f) at least one chill tank or vessel in which poultry carcasses are immersed in cold aqueous medium; wherein:
    (A) at least one aqueous liquid medium input apparatus or device adapted to provide to at least one apparatus or station downstream from the scalding vessel or station, an aqueous medium containing an effective microbial inhibiting amount of active bromine resulting from the addition to the medium of a microbiocide comprising (i) at least one 1,3-dihalo-5,5-dialkylhydantoin in which both of the halo atoms are bromine atoms and one of the alkyl groups is a methyl group and the other is a $C_{1-4}$ alkyl group or (ii) at least one 1,3-dihalo-5,5-dialkylhydantoin in which one of the halo atoms is a bromine atom and the other is a chlorine atom, and both alkyl groups are, independently, $C_{1-4}$ alkyl groups, or (iii) both of (i) and (ii);
    (B) at least one aqueous liquid medium-carrying system or apparatus adapted to carry and transmit to the scalding vessel or station, aqueous liquid medium effluent from at least one apparatus or station in which the effluent contains bromine residue remaining from input from the liquid medium input apparatus or device of (A), the at least one apparatus or station being downstream from the scalding vessel or station; and
    (C) at least one aqueous liquid medium-carrying system or apparatus adapted to carry and transmit effluent from the scalding vessel or station to a waste water treatment or purification facility adapted to utilize microbial action to reduce the biochemical oxygen demand of waste water resulting from the processing of the poultry for food.

2. The apparatus of claim 1 wherein the at least one aqueous liquid medium carrying system or apparatus in (B) is disposed or connected so as to be adapted to carry and transmit to the scalding vessel or station, aqueous liquid medium effluent from at least one apparatus or station to which (i), (ii), or (iii) is adapted to be provided in (A).

3. The apparatus of claim 1 wherein the apparatus further comprises at least one pre-chill spray cabinet or station wherein poultry carcasses are sprayed with cold aqueous medium to reduce the temperature of the carcasses being sprayed.

4. The apparatus of claim 3 wherein the apparatus further comprises a post-chill dip or spray apparatus or station in which poultry carcasses from the chill tank are rinsed with cold aqueous medium.

5. The apparatus of claim 4, wherein the at least one aqueous liquid medium carrying system or apparatus in (B) is disposed or connected so as to be adapted to carry and transmit to the scalding vessel or station, aqueous liquid medium effluent from at least one apparatus or station to which (i), (ii), or (iii) is adapted to be provided in (A).

6. The apparatus of claim 3, wherein the at least one aqueous liquid medium carrying system or apparatus in (B) is disposed or connected so as to be adapted to carry and transmit to the scalding vessel or station, aqueous liquid medium effluent from at least one apparatus or station to which (i), (ii), or (iii) is adapted to be provided in (A).

7. The apparatus of claim 1 wherein the apparatus further comprises a post-chill dip or spray apparatus or station in which poultry carcasses from the chill tank are rinsed with cold aqueous medium.

8. The apparatus of claim 7, wherein the at least one aqueous liquid medium carrying system or apparatus in (B) is disposed or connected so as to be adapted to carry and transmit to the scalding vessel or station, aqueous liquid medium effluent from at least one apparatus or station to which (i), (ii), or (iii) is adapted to be provided in (A).

* * * * *